United States Patent [19]

Chadwick, Jr.

[11] 4,189,828
[45] Feb. 26, 1980

[54] CONDUCTOR TRANSFER DEVICE

[75] Inventor: William H. Chadwick, Jr., Rossville, Ga.

[73] Assignee: Sherman & Reilly, Inc., Chattanooga, Tenn.

[21] Appl. No.: 690,918

[22] Filed: May 28, 1976

[51] Int. Cl.² .................................... H01R 43/00
[52] U.S. Cl. ............................. 29/762; 29/427; 29/631; 29/745; 59/7; 254/93 R
[58] Field of Search ............ 29/203 R, 203 C, 203 H, 29/203 HM, 203 P, 200 H, 200 P, 200 D, 252, 257, 283, 427, 631; 254/93 R, 93 H, 93 P, 134.3 R, 134.3 PA; 59/7, 745, 762, 764, 281.6

[56] References Cited
U.S. PATENT DOCUMENTS

| 1,997,109 | 4/1935 | Fyfe | 29/203 R |
|---|---|---|---|
| 2,162,070 | 6/1939 | Dunaway et al. | 29/203 R X |
| 2,613,913 | 10/1952 | Hubbard | 254/67 |
| 3,016,603 | 1/1962 | Rutland, Jr. | 29/252 |
| 3,379,005 | 4/1968 | Jones | 59/7 |
| 3,662,994 | 5/1972 | Johns | 254/93 R |
| 4,036,473 | 7/1977 | Kloster | 254/10.5 |

*Primary Examiner*—Carl E. Hall

[57] ABSTRACT

This invention provides a device enabling movement of an electrical conductor through, or from one side to the other of, a string of insulators coupled between a supporting tower and a yoke plate, and has an upper frame with clamping jaws engageable with one of the insulators, a lower frame connectable to the yoke plate, and manually operable mechanism interconnecting the two frames for selectively moving them relative to each other in the direction of the axis of the insulator string to permit uncoupling of a portion of the string, movement therethrough of the conductor, and recoupling of the string.

2 Claims, 9 Drawing Figures

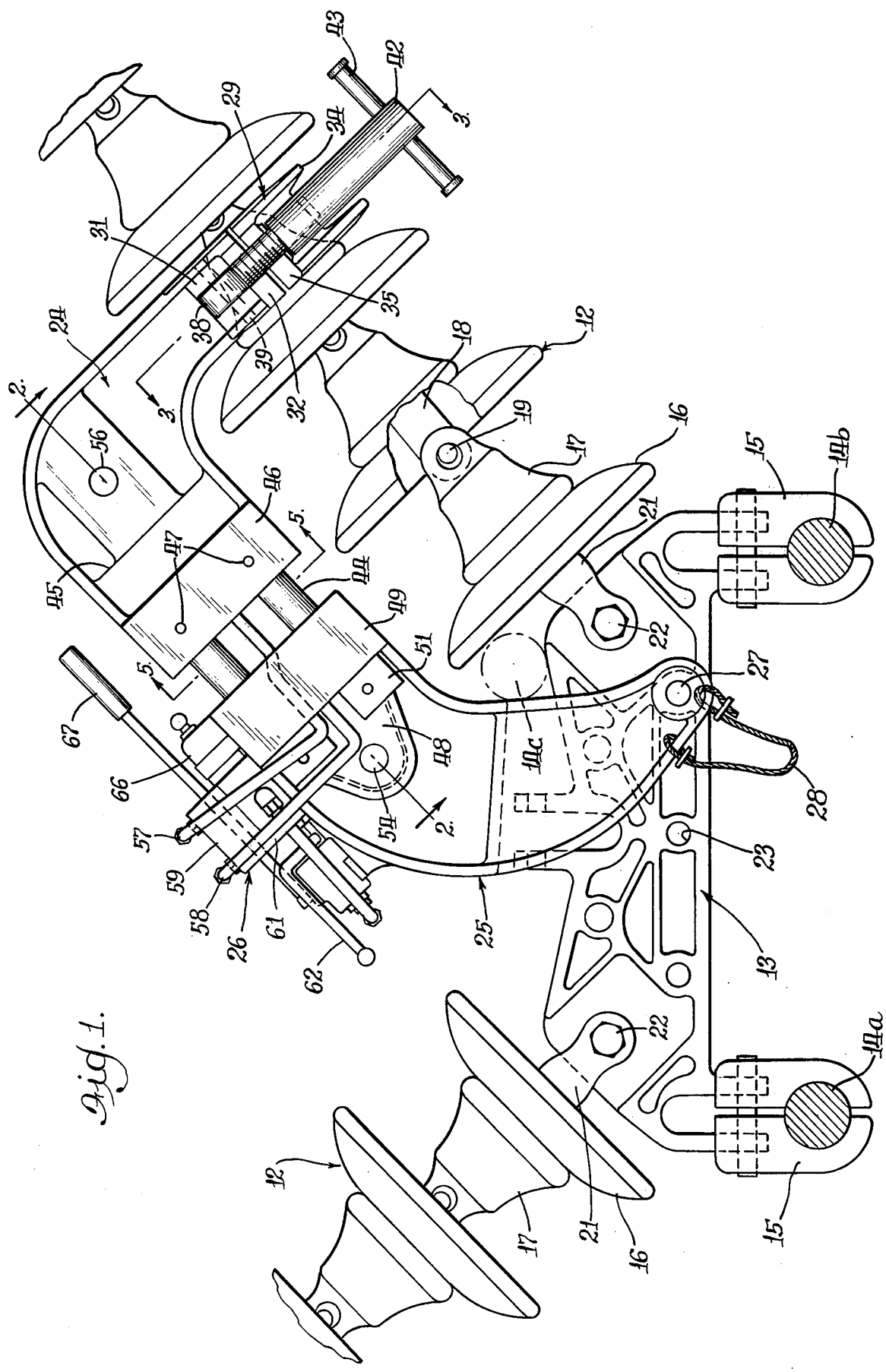

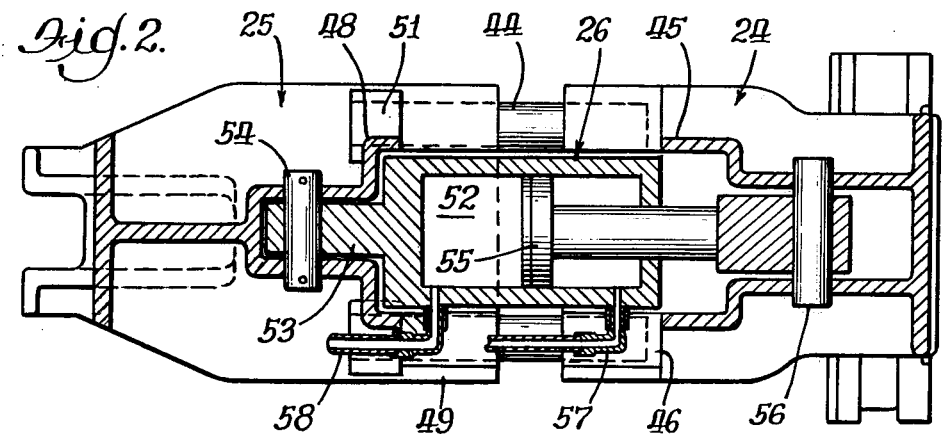
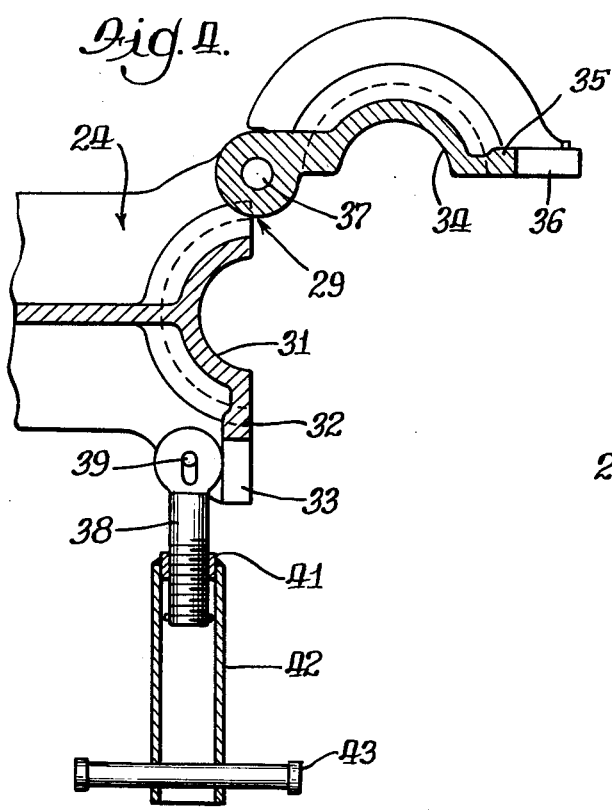
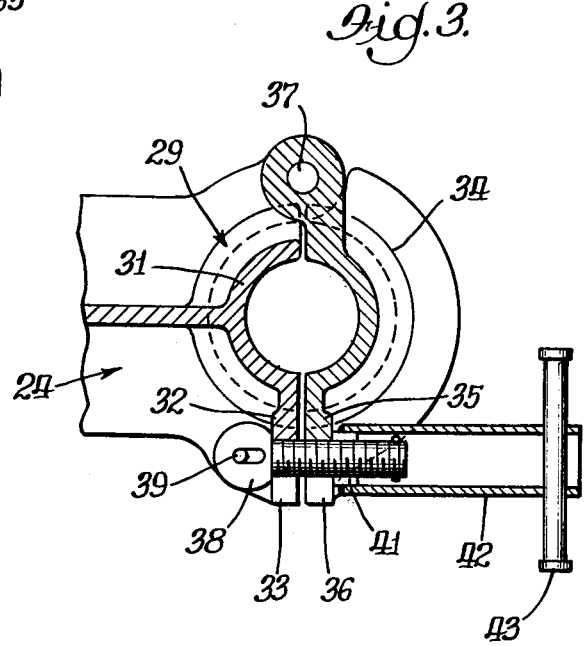
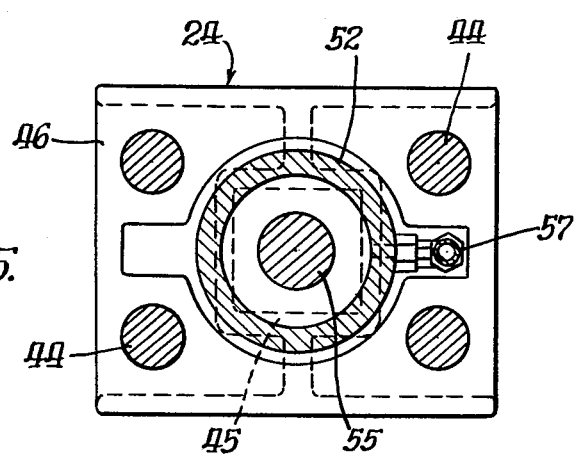

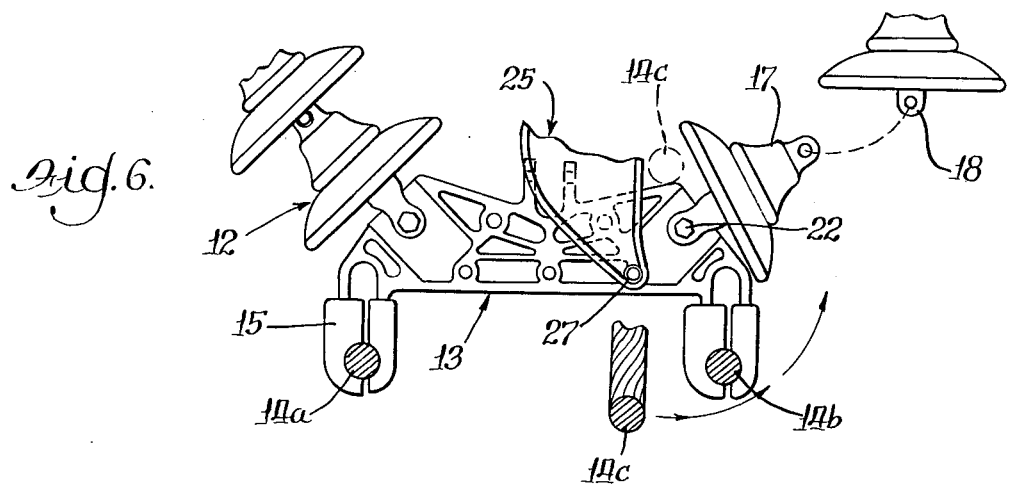
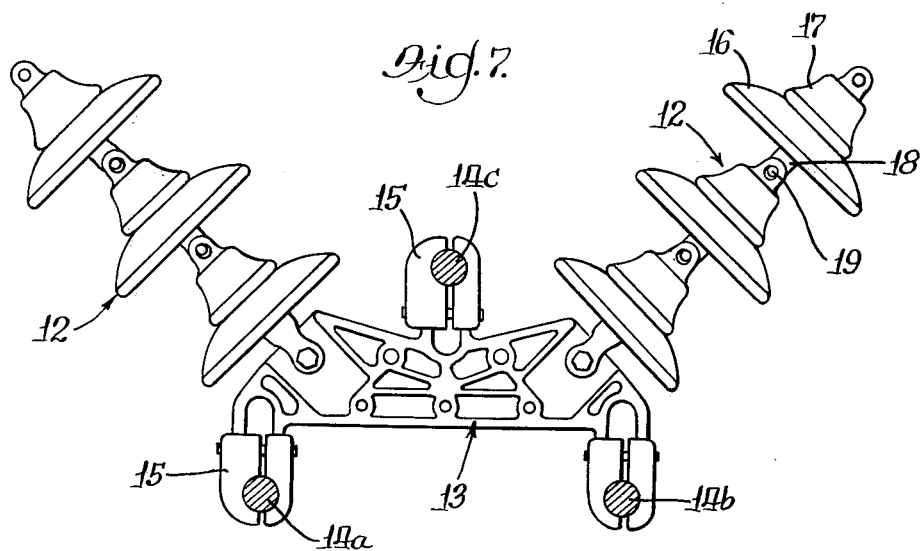
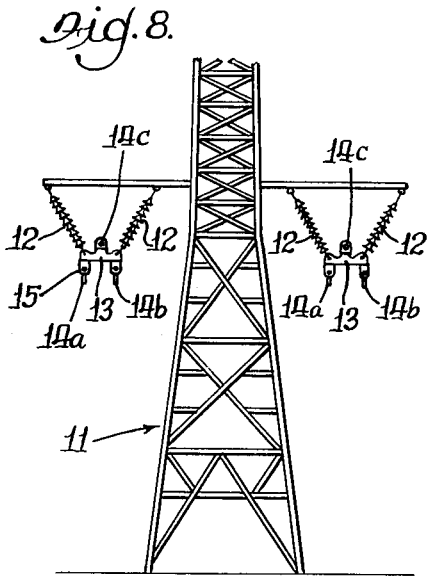
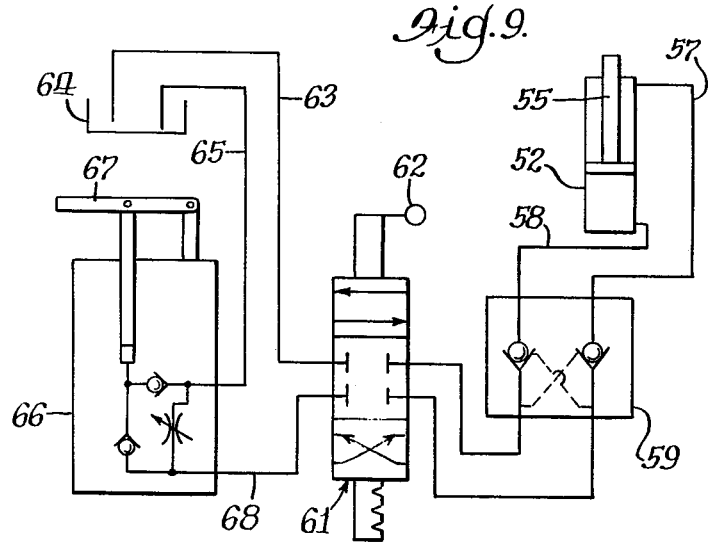

CONDUCTOR TRANSFER DEVICE

BACKGROUND OF THE INVENTION

1. Field of the Invention

This invention relates generally to aerial stringing of electrical conductors; and more particularly to the positioning of a conductor in a suspension assembly, which is supported from a tower by a string or strings of insulators, where it is necessary to mount the conductor on the other side of an insulator string from the bundle block being used in the stringing.

2. Description of the Prior Art

Stringing of conductors has developed to the point where a plurality are supported as a bundle from a tower by a suspension insulator assembly. For example, three conductors are pulled through a bundle block simultaneously and then moved therefrom into a permanent suspension assembly comprising a yoke plate for supporting them in a V configuration, with the yoke plate being suspended from a tower by two strings of insulators which also define a V. Some problems have arisen with such arrangement of a three phase power transmission line including corona effect, which results in a power loss, and radio interference or noise level, so that it has been found necessary to employ corona or grading rings.

It has been established that mounting the central sub-conductor above, rather than below, the other sub-conductors and between the insulator strings would reduce the voltage gradient across the lower insulators and eliminate the need for corona or grading rings. This would increase the performance of the overall suspension assembly and also make a shorter tower design possible, but it would require a sub-conductor to be passed or moved through a string of insulators to the other side from that where the bundle block being used in the stringing is disposed.

SUMMARY OF THE INVENTION

This invention provides a solution to that problem in the form of a device enabling movement of a conductor from one side to the other of a supporting string of insulators, coupled between a tower and a yoke plate, or the like, which comprises an upper frame having clamping means at its upper end engageable with an intermediate portion of the insulator string, a lower frame having securing means at its lower end engageable with the yoke plate, and means interconnecting the lower end of the upper frame and the upper end of the lower frame and operable to effect longitudinal movement of the frames relative to each other to permit uncoupling and recoupling of a selected portion of the string. In the drawings:

FIG. 1 is an elevational view of a conductor transfer device embodying the features of the invention in operative position connecting a string of insulators and a yoke plate for supporting a plurality of conductors;

FIG. 2 is a longitudinal sectional view taken substantially on the line 2—2 of FIG. 1;

FIG. 3 is a transverse section taken substantially on the line 3—3 of FIG. 1 through the upper clamping means;

FIG. 4 is a sectional view similar to FIG. 3 with the upper clamping means shown in open or inactive position;

FIG. 5 is a detail transverse section through the central frame guide means as taken substantially on the line 5—5 of FIG. 1;

FIG. 6 is an elevational view like FIG. 1 with only a part of the lower leg of the device shown, three sub-conductors being in section and an insulator string uncoupled to illustrate an intermediate step in transferring a conductor from one side to the other of that insulator string;

FIG. 7 is a view like FIG. 6 with the uncoupled insulator string shown recoupled, the transfer device removed and the central sub-conductor secured to the yoke plate;

FIG. 8 is a diagrammatic view of a tower carrying two bundles of three sub-conductors, each in inverted-V arrangement supported by V-strings of insulators; and FIG. 9 is a schematic of an hydraulic system forming part of the conductor transfer device.

DESCRIPTION OF THE PREFERRED EMBODIMENT

Referring more particularly to FIG. 8, reference numeral 11 indicates in general a tower of any suitable construction with a conductor suspension assembly at each side including V-strings 12 of insulators supporting yoke plates 13, each of which in turn supports sub-conductors 14a, 14b and 14c, as by means of clamps 15.

Each string of insulators 12 comprises a plurality of individual insulators each having a porcelain body 16, a metal cap 17 cemented on the body 16, and a metal bolt 18 (FIG. 1) secured to and depending from the body 16. It will be appreciated that any suitable type of insulator may be used, such as ball and socket or tongue and socket, and that the specific type of insulator employed is not material to this invention. The cap 17 herein illustrated is formed at its upper end as a socket for receiving the lower tongue end of the bolt 18 on the next higher adjacent insulator, and both socket and bolt are apertured to enable their interconnection by a suitable pin 19. Each insulator string 12 thus is made up of a plurality of interconnected insulators which is supported at its upper end by the tower by any suitable type of connector fitting. As best seen in FIG. 1, the lowermost insulator in each string 12 is provided with a socket clevis 21 which straddles the yoke plate 13 and is secured thereto by a socket clevis bolt 22.

The yoke plate 13 is designed to support the three sub-conductors 14a, 14b and 14c in an inverted-V arrangement as shown in FIGS. 7 and 8, rather than the regular-V arrangement, in order to place the bottom insulators in an equipotential field with the conductors, the central or apex conductor 14c being disposed between its supporting insulator strings 12. This requires the displacement of conductor 14c from outside or one side of an insulator string 12 to the other side thereof during a stringing operation after a bundle block (not shown) has been employed in well-known manner to pull in the three conductors, the yoke plate 13 being provided with a central lower aperture 23 to facilitate suspending the bundle block therefrom. It will be appreciated that when the yoke plate 13 is first connected to the strings of insulators 12, the latter each define a catenary, but that they are pulled downwardly to assume substantially straight lines when a bundle block is secured to the yoke plate and the conductors 14a, 14b and 14c are pulled in. The two conductors 14a and 14b may be freed from the bundle block and secured to the yoke plate 13 by clamps 15 in the usual manner, but conductor 14c has to be moved up and through one of the insulator strings 12, as illustrated in FIG. 6. It should be understood that the exact sequence of tying in the several conductors is not the essence of the invention and that it obviously is desirable to so proceed that until the movement of the one conductor through one of the insulator strings has been accomplished, a load is maintained at all times on the yoke plate sufficient to prevent it from rising substantially in response to movement of the insulator strings back toward catenary condition because of lessening of such load.

The device of this invention, which is provided to enable such movement of a conductor through, or from one side to the other of, a supporting insulator string is disclosed in a preferred embodiment herein illustrated as comprising an upper frame 24 (FIG. 1), a lower frame 25, and means indicated generally by reference numeral 26 for interconnecting the lower end of the upper frame 24 and the upper end of the lower frame 25 and operable to effect longitudinal movement of the frames 24, 25 relative to each other. The lower end portion of the lower frame 25 is bifurcated to enable it to straddle the yoke plate 13 and is apertured to receive a flanged ball-lock pin 27 which may be inserted through an aperture in the yoke plate similar to the aperture 23 therethrough and aligned with a socket clevis bolt 22 and axially of its associated insulator string 12. The flange of pin 27 preferably is loosely connected to the lower frame 25 by a keeper cord or lanyard 28.

The upper end of the upper frame 24 is provided with clamping means, indicated generally by reference numeral 29, which comprises a first semi-circular jaw 31 (FIGS. 3 and 4) formed at the end of the frame and having a lateral extension 32 with a first slot 33 in its outer end, and a second semi-circular jaw 34 shaped complementally to jaw 31, with a lateral extension 35 having a second slot 36 in one end aligned with the first slot 33 and pivotally mounted at its other end at 37 on the upper frame 24. The clamping means 29 is completed by a bolt 38 pivotally mounted at 39 on frame 24 for movement into and out of the slots 33, 36, with its free end threaded to receive a nut 41 for engagement with the lateral extension 35 of the jaw 34 (FIG. 3) and a sleeve 42 having its inner end secured in any suitable manner to the nut 41 and provided at its outer end with a radially extending handle 43.

The jaws 31 and 34 of the clamping means 29 are adapted to embrace the metal cap 17 of one of the insulators in a string 12, after which the lower frame is secured to the yoke plate 13 by the pin 27, as shown in FIG. 1, the sleeve extension 42 from the tightening nut 41 preventing a lineman from scraping or damaging the porcelain body 16 of the insulator when securing or loosening the clamping means. This, together with the handle 43, eliminates any need for a wrench. As also is best seen in FIG. 1, the lower portion of the upper frame 24 and the upper portion of the lower frame 25 are aligned with each other longitudinally of the transfer device, and their other ends are offset therefrom so that the centers of the jaws 31, 34 of the clamping means 29 and of the securing means or pin 27 define a longitudinal axis which coincides with that of the insulator string 12.

The means 26 interconnecting the frames 24 and 25 includes four guide pins 44 (FIGS. 1, 2 and 5) which are parallel to that longitudinal axis. The lower part of the upper frame 24 defines a hollow housing 45 with an end portion 46 having suitable apertures for receiving the upper ends of the guide pins 44 which are secured thereto by pins 47 (FIG. 1). The upper part of the lower frame 25 similarly defines a hollow housing 48 with an end portion 49 having apertures extending therethrough slidably receiving the guide pins 44 (FIG. 2). Stop rings 51 are mounted on and suitably secured to the lower ends of guide pins 44 to limit downward sliding of the lower frame 25 on pins 44.

The interconnecting means 26, as previously noted, also effects longitudinal movement of the frames 24 and 25 relative to each other. To this end it includes an hydraulic cylinder 52 (FIG. 2) having a connecting member 53 secured to its lower end, as by welding, which is disposed within the housing 48 and is connected thereto by a pin 54. A piston 55 mounted in the cylinder 52 has its rod extending upwardly in the housing 45 and connected thereto by a pin 56. The upper end of the cylinder 52 is connected in well-known manner to an hydraulic line or conduit 57 and the lower end of the cylinder similarly is connected to a line 58. A double pilot operated check valve 59 (FIG. 1) is interposed in the lines 57, 58, and beyond the valve 59 those lines are connected to a four-way manual threeposition detent control valve 61 which is controlled or positioned by a handle 62. The interconnection of these hydraulic mechanisms is illustrated schematically in FIG. 9 which also shows a conduit 63 connecting the valve 61 to a reservoir or source of fluid 64 and an inlet conduit 65 connecting the reservoir 64 to a hand pump 66. The latter is operable by a handle 67 and is connected to the control valve 61 by an outlet conduit 68. The hand pump 66 and reservoir 64 preferably are formed as an integral unit.

The valve 59 prevents the cylinder 52 from bleeding down should there be an hydraulic failure in the pump 66 or the control valve 61. This also makes it necessary to power the cylinder 52 down, instead of allowing it to bleed down by gravity or be forced down by an external load. Such operation is important here because the insulators will not withstand very high shock or impact loads. It will be readily apparent from FIG. 9 that the control valve 61 may be operated by its handle 62 to select the power-up or power-down modes of the cylinder 52 and its piston 55 in response to operation of the pump 66 by means of its handle 67.

As previously noted, the device of this invention is employed during a conductor stringing operation, for example, after the sub-conductors 14a and 14b have been secured to the yoke plate 13 by the clamps 15 and it is desired to move the third sub-conductor 14c upwardly through one of the insulator strings 12. To enable such movement of the subconductor 14c, the lineman will interconnect a portion of the insulator string 12 through which the conductor is to be moved and the yoke plate 13, as shown in FIG. 1. To accomplish this, with the jaws 31 and 34 in their open position of FIG. 4, the upper frame 24 is moved into position to align the central axis of the jaw 31 with that of the insulator string 12. The movable jaw 34 then is swung about its pivot 37 so that the jaws 31, 34 embrace the metal cap 17 of one of the insulators, the bolt 38 and sleeve 42 are swung about the pivot 39 to move the bolt into the slots 33, 36, and the nut is tightened against the lateral extension 35 by means of the sleeve handle 43. The lower frame 25 then is mounted upon the yoke plate and connected by the pin 27 thereto. The insulator thus engaged by the clamping means 29 will not be damaged in any way and downward movement of the upper frame 24 relative to the lower frame 25 will apply a force to the engaged insulator only in the direction of the axis of the insulator string 12.

Such relative movement is accomplished by first adjusting the valve handle 61 to set the control valve in position for a power-up mode, and then actuating the pump handle 67. This will force fluid into the upper portion of the cylinder 52 through the line 57 to move the piston 55 downwardly. Since the piston 55 is secured to the upper frame 24 by the pin 56 and the cylinder 52 is secured to the lower frame 25 by the pin 54, the result will be a relative movement of the frames 24, 25 toward each other. The guide pins 44 will prevent any twisting of the frames during such operation.

Only a relatively small degree of relative movement of the frames is required, i.e., just enough travel to relieve the pressure on the socket clevis bolt 22 and the insulator connecting pins 19 between the yoke plate 13 and the insulator which is engaged by the clamping means 29. At that point, the socket clevis bolt 22 may be removed and the lowermost insulator swung outwardly, which will provide clearance for movement of the sub-conductor 14c upwardly to the dotted line position illustrated in FIG. 1. FIG. 6 illustrates how such movement of the sub-conductor 14c through the insulator string 12 may be accomplished, if desired, by removing the insulator pin 19 normally connecting the lowermost and the next adjacent insulator and separating those two, as shown in FIG. 6, so that the sub-conductor 14c may be moved between the so separated insulators and onto the upper portion of the yoke 13.

Upon completion of the movement of the conductor through the insulator string, or from one side of it to the other, the insulator string is reconnected by replacing the bolt 22 or pin 19 and the valve 61 is adjusted by moving its handle 62 to a power-down mode. Subsequent operation of the pump handle 67 will move the frames 24, 25 away from each other. The insulator string 12 thus will resume its support of the yoke plate 13, and the clamping means 29 may be released and moved to their open position of FIG. 4 and the device disconnected from the yoke plate by removing the ball-lock pin 27. The sub-conductor 14c then may be moved from its broken line position of FIGS. 1 and 6 and connected in its final position of FIG. 7 to the yoke plate 13 by a clamp 15.

It will be appreciated that this device will apply only a tension load at any time to an insulator and that portion of the string of insulators that remains in operative condition during a conductor transferring operation. It will also be appreciated that other systems may be employed in place of the hydraulic mechanisms herein illustrated, it being remembered that the device will be capable of manual operation or control by a lineman in such manner as to apply only a tension load to an insulator and to prevent damage of any kind to the insulator string or the conductors. While the device is herein illustrated and described in connection with the stringing and mounting of three sub-conductors in an inverted-V arrangement, it may be employed in any situation where a conductor is required to be moved through a string of supporting insulators or from one side thereof to the other, whether the support be by a single string of insulators, two strings in V arrangement, or some other arrangement.

I claim:

1. A device enabling movement of a conductor from one side to the other of a string of insulators coupled between a tower and a yoke plate, comprising an upper frame having clamping means at its upper end for engaging an intermediate portion of said string, a lower frame having securing means at its lower end for engaging said yoke plate, and means interconnecting the lower end of said upper frame and the upper end of said lower frame for effecting longitudinal movement of said frames relative to each other to permit uncoupling of a selected portion of said string to permit movement of said conductor past said selected portion from one side of said string to the other and subsequent recoupling of said selected portion of said string, wherein said clamping means and said securing means are aligned with each other longitudinally of the device to define a longitudinal axis, and the lower end of said upper frame, the upper end of said lower frame and said means for interconnecting the same are offset relative to said axis, and wherein said clamping means comprises a first semi-circular jaw formed at the upper end of said upper frame and having a lateral extension with a first slot in its outer end, a second semicircular jaw shaped complementally to said first jaw with a lateral extension having a second slot in one end aligned with said first slot and pivotally mounted at its opposite end on said upper frame, a bolt pivotally on said upper frame for movement into and out of said slots, and a nut threaded on said bolt for engagement with said lateral extension of said second jaw.

2. In a device according to claim 1, a sleeve having an inner end secured to said nut, and a handle mounted on the outer end of said sleeve for manually rotating said nut.

* * * * *